July 15, 1952 — H. F. DALGLISH ET AL — 2,602,953
LAWN MOWER HANDLE
Filed July 8, 1948 — 3 Sheets-Sheet 1
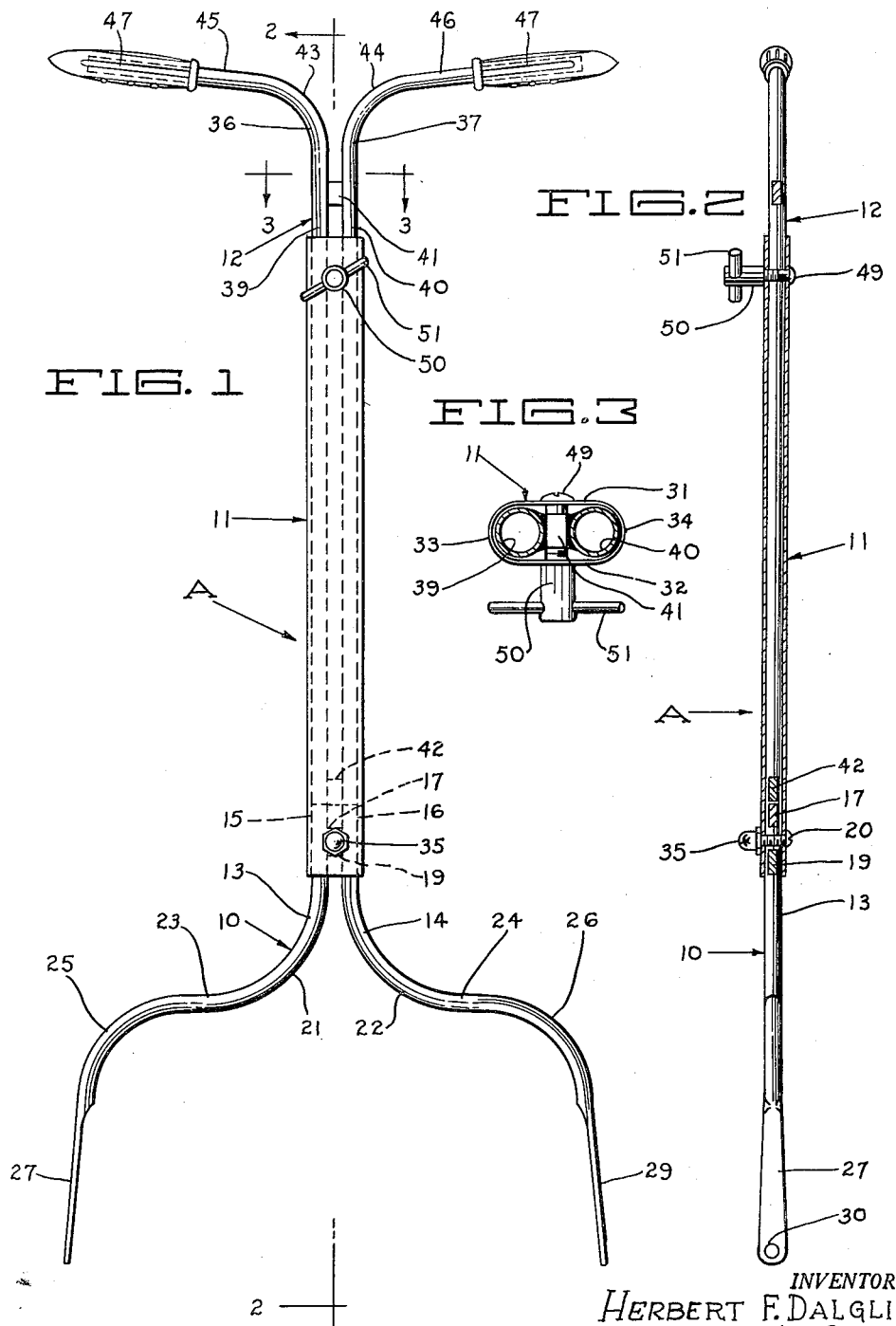
INVENTOR.
HERBERT F. DALGLISH
CHARLES A. WELLIVER
Robert M. Dunning

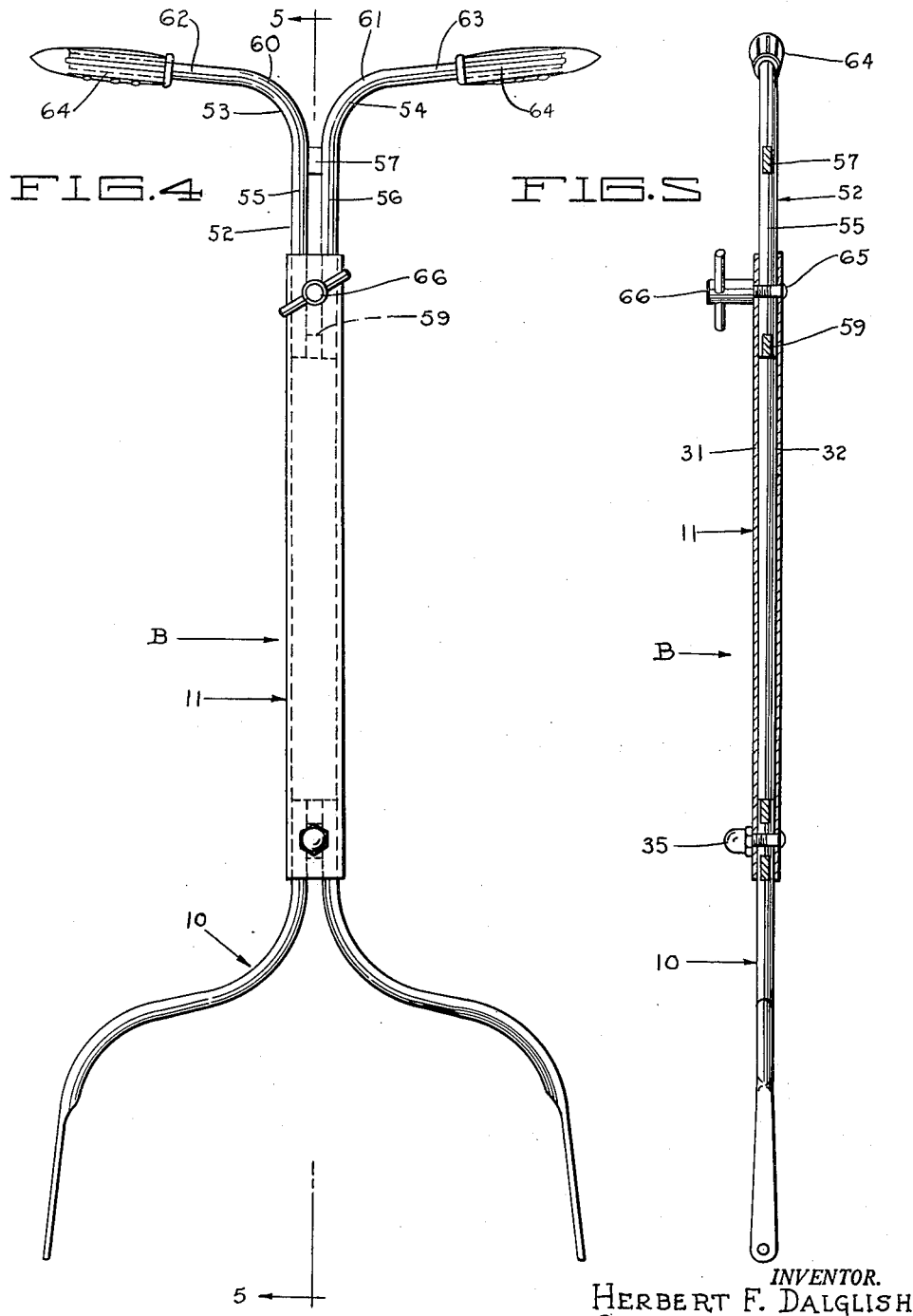

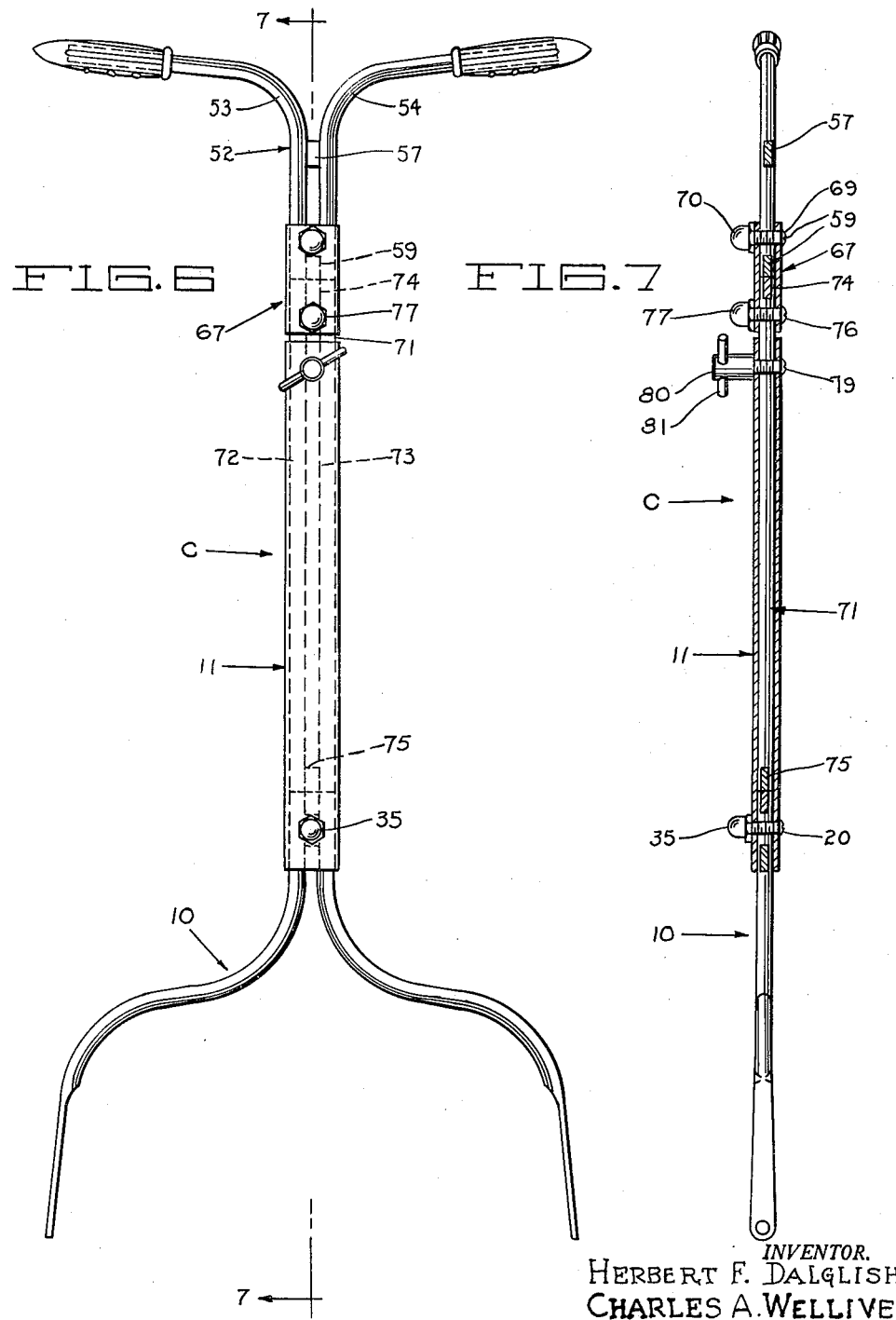

Patented July 15, 1952

2,602,953

UNITED STATES PATENT OFFICE 2,602,953

LAWN MOWER HANDLE

Herbert F. Dalglish, St. Paul, and Charles Welliver, Minneapolis, Minn.; said Welliver assignor to said Dalglish Application July 8, 1948, Serial No. 37,733

11 Claims. (Cl. 16—111)

Our invention relates to an improvement in lawn mower handles wherein it is desired to provide a handle suitable for use on a lawn mower or the like.

Lawn mower handles of the usual type are of fixed length. While these handles are usually pivotally connected to the lawn mower so as to pivot through definite angular limits, the fixed length of the handle has certain definite disadvantages. For example a lawn mower usually operates to a best advantage when the handle is at a predetermined angle to the ground. When the handle is lowered toward horizontal position, there is a tendency for the rear end of the lawn mower to rise up when the lawn mower strikes an obstruction, thereby lifting the lawn roller and cutter bar when this cutter bar is located as usual, behind the wheels of the mower. If the handle is held at too steep an angle relative to the ground, there is a tendency for the rear end of the lawn mower to be urged into contact with the ground with unusual force, thus making the mower more difficult to operate. At the same time, however, persons of various heights use lawn mowers and it is difficult for a child or short person to hold the handle as high as it would be held by an extremely tall person. The best way to compensate for the various heights of persons using the mower is by changing the length of the handle.

An object of the present invention lies in the provision of a lawn mower handle which comprises a plurality of parts detachably connected together. In preferred form of construction these parts are so connected that the handle may be varied in length to compensate for persons of varying height.

A feature of the present invention lies in the provision of a handle formed of at least three or more main parts. One of these parts comprises a forked member designed for attachment to the frame of the mower. A second part comprises a tubular member which may be secured to the forked member in telescoping relation thereto. The third main portion of the invention comprises a handle member which extends into telescoping relation with the tube previously described. As a result the three parts of the handle are detachably connected together and may be taken apart for conservation of space during shipment or storage.

A feature of the present invention lies in the fact that the handle unit may if desired be elongated sufficiently to telescope into the top member throughout most of the length thereof. By adjustably connecting these two elements together, it is possible that the handle may be extended so as to elongate the handle a considerable amount when desired. As a result my lawn mower may more readily be used in cutting inclined surfaces, terraces and the like where an unusually long handle is of decided advantage.

An added feature of the present invention resides in the fact that the telescoping handle unit may if desired be formed in two separable parts so that no part of the structure is too long to be conveniently packed or stored. In place of the elongated member on the tubular handle, the handle unit comprises an elongated shank and a cross bar member which are detachably connected together for storage of the various parts in a minimum of space.

An added feature of the present invention lies in the provision of a forked end including a pair of bent members terminating in parallel relationship for engagement within a tubular handle. The handle element may also comprise a pair of members bent outwardly at one end and secured in parallel relation at the other end for slidable engagement within the tubular member. The tubular member is of sufficient width to accommodate the parallel portions.

Other advantages of the present invention will be apparent upon a study of the detail structure of my device.

In the drawings forming a part of our specification:

Figure 1 is an elevation view of a handle showing the construction thereof.

Figure 2 is a longitudinal sectional view on the line 2—2 of Figure 1.

Figure 3 is a cross sectional view on the line 3—3 of Figure 1.

Figure 4 is an elevational view of a modified form of handle construction.

Figure 5 is a sectional view on the line 5—5 of Figure 4.

Figure 6 is an elevation view of another form of handle construction.

Figure 7 is a sectional view on the line 7—7 of Figure 6.

The handle A, illustrated in Figures 1 through 3 of the drawings includes a forked end unit 10, a tubular unit indicated in general by the numeral 11, and a handle unit including in general the numeral 12. These three units are attached together as will be described in detail to form the completed handle.

The forked end unit 10 includes a pair of tubular members 13 and 14 which are provided with parallel ends 15 and 16 which are held in parallel spaced relationship by spacing blocks 17 and 19. The spacing blocks 17 and 19 are welded to the top ends 15 and 16 and are spaced a distance sufficient to allow a clamping bolt 20 to extend therebetween as will be later described. The tubular members 13 and 14 are bent outwardly in a common plane at 21 and 22 until they extend in opposite directions in preferably a common plane as indicated at 23 and 24. The tubes 13 and 14 then curve in the opposite direction as indicated at 25 and 26 so as to provide ends 27 and 29 which are in virtually parallel relationship. The ends 27 and 29 are flattened as indicated in the drawings and are apertured near their ends as indicated in the drawings at 30 for accommodation of lugs on the frame of the mower or with suitable handle attaching pivot means.

The tubular unit 11 comprises an elongated tubular body having substantially parallel sides 31 and 32 and rounded ends 33 and 34. The rounded ends 33 and 34 are spaced sufficiently to allow the insertion of the parallel ends 15 and 16 of the forked end unit 10. As illustrated in Figures 1 and 2 of the drawings the bolt 20 extends through the parallel sides 31 and 32 of the tubular unit 11 between the spacing blocks 17 and 19. A nut 35 is provided on the bolt 20 to clamp the forked end 10 to the lower end of the tubular handle section 11.

The handle unit 12 includes a pair of tubular members 36 and 37 which are provided with parallel lower end portions 39 and 40 respectively. A spacing block 41 is positioned between these tubular members near the upper end of the parallel portions thereof. A similar spacing block 42 is provided between the lower ends of these tubular members. The spacing blocks 41 and 42 are preferably welded or otherwise affixed in place so as to hold the tubular members in parallel relationship.

The tubular members 36 and 37 are bent outwardly at 43 and 44 to provide outwardly directed end portions 45 and 46. Handle grips 47 are provided on the handle extremities 45 and 46 and are held in place in any suitable manner.

A bolt or cap screw 49 extends through the parallel sides 31 and 32 of the tubular unit 11. A threaded cap nut 50 is threadably engaged on the bolt 49. A rod 51 extends diametrically through the cap nut 50 and is secured thereto to provide oppositely disposed arms by means of which the cap nut may be easily rotated. Means are provided for holding the bolt 49 from rotation relative to the tubular side wall 31 such as providing a square portion on the bolt adjacent the head and providing a similarly shaped aperture in the tubular side wall 31.

The operation of the handle is believed obvious from the foregoing description. By removing the nuts 35 and 50 the bolts 20 and 49 may be removed, whereupon the handle section 12 and the forked end unit 10 may be disengaged therefrom. In use the forked end 10 remains permanently attached to the tubular section 11 and the nut 35 is tightened to hold the end in place. By loosening the cap nut 50 the handle unit 12 may be slid longitudinally in the tubular body unit 11 from one extreme position where the end of the handle unit abuts against the end of the forked end unit to a second extreme position where the spacing bar 42 engages against the bolt 49. In either of these extreme positions or in any intermediate position the cap nut 50 may be tightened to clamp the handle unit 12 in adjusted relation relative to the tubular section. Thus the handle may be elongated a considerable extent, a feature of extreme importance in the use of the mower on inclined surfaces, banks, or over terraced grass.

The handle B illustrated in Figures 4 and 5 of the drawings is in some ways identical to the handle A previously described and the various parts of the two handles which are identical have been given similar numbers. For example the forked end unit of the handle B is identical to the forked end unit of the handle A and accordingly is identified by the numeral 10. The tubular unit of the handle B is likewise identical to that of the handle A and is thus identified by the numeral 11. The handle unit however, differs somewhat from the handle unit 12 and thus is identified generally by the numeral 52.

The handle unit 52 includes a pair of tubular arms 53 and 54 which include parallel ends 55 and 56 respectively. Spacing blocks 57 and 59 are provided between the parallel ends 55 and 56 to hold these ends in properly spaced relation. The upper ends of the parallel portions 55 and 56 are outwardly bent at 60 and 61 to provide outwardly directed extremities 62 and 63. Handle grips 64 are mounted on these extremities 62 and 63. A bolt 65 extends through the opposite sides 31 and 32 of the tubular unit 11 and a nut 66 is provided on the bolt 65 for clamping the handle unit in position relative to the tubular unit 11. The nut 66 may be similar to the cap nut 50 or may be similar to the cap nut 35 as the handle unit 52 is relatively short and not adjustable through any extensive amount.

The purpose of the construction of the handle B is to provide a handle which is collapsible although not adjustable through any extensive movement. When the bolts connecting the various parts of the handle B are removed the handle is divided into three sections, all of which are relatively short and relatively narrow so that the entire handle may be easily packed within the container ordinarily employed for the mowing head of the lawn mower. The three sections of the handle are a compromise between length and width and are of proper dimensions to be easily contained with the frame of the mower and mower unit.

The handle C illustrated in Figures 6 and 7 of the drawings is a combination of the handles A and B previously described and contains a number of parts which are identical to those previously described. The forked end unit of the handle C is identical to that described in conjunction with handles A and B and accordingly is identified by a similar numeral 10. The tubular unit 11 is likewise similar to that previously described in conjunction with handles A and B and is thus also given similar identifying numerals. The handle unit is identical to the unit 52 described in conjunction with the handle B and accordingly similar identifying numerals are employed.

In the handle C the forked end unit 10 is telescoped into the lower end of the tubular unit 11 and is held in place by a bolt 20 having a nut 35 thereupon.

The handle unit 52 extends into a tubular section 67 which is similar in cross section shape to the tubular section 11 but is relatively short in length. The tubular section 67 has a bolt 69 extending through the opposite parallel sides thereof and a clamping nut 70 is provided on this bolt 69. By tightening the nut 70 the handle unit 52 may be attached to the tubular section 67 with the bolt 69 extending between the spacing blocks 57 and 59.

A slidable section 71 is attached to the tubular sections 67 and 11 to connect these sections. The slidable sections 11 comprises a pair of similar parallel tubular members 72 and 73 which are connected at opposite ends by spacing blocks 74 and 75. The tubular members 72 and 73 are of similar outer diameter to the pairs of arms 53 and 54 of the handle unit 52 and extend in abutting relation thereto. A bolt 76 extends through the parallel sides of the tubular section 67 and a clamping nut 77 may be tightened to clamp the slidable section 71 to the tubular unit 67. The bolt 76 extends beneath the spacing bar 74 and between the tubular members 72 and 73 so as to hold the slidable section engaged in the unit 67.

A bolt 79 extends through the parallel sides 31 and 32 of the unit 11 and a cap nut 80 is supported thereupon. The cap nut 80 is similar to the nut 50 and is provided with a cross bar 81 extending therethrough by means of which the cap nut may be easily rotated.

The handle C combines the advantages of handles A and B. It will be noted that by loosening the cap nut 80 the slidable section 71 may be withdrawn from the tubular unit 11 until the cross bar 75 engages the bolt 79. The slide section 71 may be clamped in either extreme position or in any intermediate position so as to hold the handle at the proper length. Thus the handle may be substantially elongated when desired for operating the mower over inclined surfaces and the like.

The handle C also has the advantage of handle B in not providing any section which is of substantial length. In order to provide adjustment it is necessary to telescope one end section relative to the central tubular section 11. It will be noted that the handle unit 12 of the handle A is of substantial length and therefore can not be as easily packed as the shorter handle section 52. By providing an additional connecting section 67 the handle section may be divided into two separate parts, thereby reducing the length of either part.

In accordance with the patent statutes, we have described the principles of construction and operation of our lawn mower handles, and while we have endeavored to set forth the best embodiments thereof, we desire to have it understood that obvious changes may be made within the scope of the following claims without departing from the spirit of our invention.

We claim:

1. A handle including a forked end unit having a projecting shank thereupon, a handle unit including outwardly extending handles and a projecting shank thereupon, a tubular member into which said shanks are inserted, means adjacent one end of the tubular member for securing one of the shanks to said tubular member, and means adjacent the other end of the tubular member for clamping the other shank and preventing relative sliding movement thereof with respect to said tubular member, said shanks substantially abutting in one slidable position of said other shank.

2. A handle including a forked end unit comprising a pair of curved arms having the ends thereof connected in parallel spaced relation, a handle unit including a pair of curved bars having outwardly directed ends, said last named arms having parallel portions, spacing means interposed between the parallel portions for holding said portions in spaced relation, and a tubular element designed to receive said parallel ends of said units.

3. A handle including a forked end unit comprising a pair of curved arms having parallel ends thereupon, a handle unit including outwardly curved arms having parallel end portions, a pair of blocks between said parallel arm portions and secured thereto to hold said parallel arm portions in parallel spaced relation, and a flattened tubular member into which said parallel end portions are inserted.

4. The structure defined in claim 3 and including fastening means extending through said flattened tubular member between parallel ends of said units.

5. The structure defined in claim 3 and including clamping means extending through said flattened tubular member between said parallel end portions and between said spacing blocks connecting the same.

6. The structure defined in claim 3 and including fastening means extending through said flattened tubular member and between said parallel end portions of said units, to secure said units to said tubular member, the spacing blocks between said parallel end portions being spaced apart sufficiently to allow said clamping means to extend therebetween and to permit relative slidable movement between the unit and said tubular member.

7. A handle including a forked end unit comprising outwardly curved arms having parallel end portions, spacing block means connecting said parallel end portions and holding said end portions in spaced relation, a handle unit including a pair of outwardly curved arms having parallel end portions, spacing blocks connecting said parallel end portions and holding said last named end portions in spaced relation, a pair of elongated extension bars arranged in alignment with said parallel end portions of said handle unit, means for holding said parallel end portions of said handle unit in abutting relation with said extension bars, a tubular body designed to accommodate the parallel end portions of said forked end unit and the parallel arms of said extension bars, first means through said tubular member and between the extension bars to hold the latter in the tubular member, and second means extending through the tubular member and between the parallel end portions of the forked end unit to hold the latter in the tubular member.

8. A handle including a forked end unit including a pair of outwardly curved arms having parallel end portions, means connecting said parallel end portions and holding the same in spaced relationship, an elongated tubular connecting member into which said parallel end portions are engaged, means extending through the tubular member and between the parallel end portions of the forked end unit to hold the latter in the tubular member, a handle unit including a pair of outwardly curved arms having parallel end portions, spacing blocks holding said parallel end portions in parallel spaced relationship, an extension unit including parallel arms and spacing blocks holding said arms connected in spaced relation, means connecting the arms of said extension unit to the parallel end portions of said handle unit in aligned relation therewith, and means adjustably connecting said extension unit in telescoping relation to said tubular member.

9. The structure defined in claim 8 wherein the extension member is slidably received in said tubular member and retainable at a selected position with respect to said tubular member by said last named means.

10. The structure defined in claim 8 wherein the extension unit is slidably accommodated in the tubular member and the last named means includes a clamping bolt extending between the arms of said extension unit between the spacing means thereof and through said tubular member, the clamping bolt when tight serving to prevent sliding of said extension unit.

11. A handle comprising a forked end unit including a pair of outwardly curved arms having parallel end portions, a spacing element connecting said parallel end portions and holding said end portions in spaced relation, a handle unit including outwardly curved arms having parallel end portions, a pair of spacing elements connecting and holding said last named parallel end portions in spaced relation, said pair of elements being spaced a substantial distance apart, a tubular member designed to accommodate said parallel end portions of each unit, means for retaining the forked end unit in fixed relation with said tubular member, and a clamping bolt extending through said tubular member between the spaced parallel end portions of said handle unit and between said pair of spacing elements to allow relative slidable movement between said handle unit and said tubular member when said bolt is not in clamping engagement with said tubular member.

HERBERT F. DALGLISH.
CHARLES WELLIVER.

REFERENCES CITED

The following references are of record in the file of this patent:

UNITED STATES PATENTS

| Number | Name | Date |
|---|---|---|
| D. 117,693 | Kluter | Nov. 21, 1939 |
| 271,471 | Johnston | Jan. 30, 1883 |
| 274,239 | Whitcomb | Mar. 20, 1883 |
| 1,084,165 | Page | Jan. 13, 1914 |
| 1,106,053 | Nichols | Aug. 4, 1914 |
| 1,112,190 | Beazley | Sept. 29, 1914 |
| 2,281,923 | Davis | May 5, 1942 |
| 2,477,442 | Cramer | July 26, 1949 |
| 2,511,160 | Grobowski | June 13, 1950 |